United States Patent
Toida et al.

[11] Patent Number: 6,062,062
[45] Date of Patent: May 16, 2000

[54] SENSITIVITY CALIBRATING METHOD FOR DETECTOR OF COMPARATOR

[75] Inventors: Yoichi Toida; Toshiro Horikawa, both of Kawasaki, Japan

[73] Assignee: Mitutoyo Corporation, Kawasaki, Japan

[21] Appl. No.: 09/102,119

[22] Filed: Jun. 22, 1998

[30] Foreign Application Priority Data

Jun. 25, 1997 [JP] Japan .................................. 9-168613

[51] Int. Cl.[7] .................................................. G01B 21/16
[52] U.S. Cl. .............................. 73/1.81; 33/502; 702/97
[58] Field of Search .................................. 73/1.79, 1.81; 33/502; 702/97, 94, 95

[56] References Cited

U.S. PATENT DOCUMENTS

| | | | |
|---|---|---|---|
| 3,541,435 | 11/1970 | Foster et al. | 324/662 |
| 4,731,932 | 3/1988 | Kristeven | 33/501.06 |
| 4,841,460 | 6/1989 | Dewer et al. | 702/95 |
| 4,841,762 | 6/1989 | Hunter | 73/1.79 X |
| 4,848,137 | 7/1989 | Turner et al. | 73/1.81 |
| 4,914,610 | 4/1990 | Shimizu et al. | 73/1.79 X |
| 4,982,504 | 1/1991 | Soderberg et al. | 73/1.79 X |
| 5,305,240 | 4/1994 | Davis et al. | 73/1.79 X |
| 5,313,410 | 5/1994 | Wetts | 73/1.79 X |
| 5,530,548 | 6/1996 | Campbell et al. | 356/375 |
| 5,778,549 | 7/1998 | Campanile | 702/95 X |

*Primary Examiner*—Thomas P. Noland
*Attorney, Agent, or Firm*—Oliff & Berridge, PLC

[57] ABSTRACT

The object of present invention is to provide a sensitivity calibrating method for a detector of a comparator, which enables easy and highly accurate sensitivity calibration for a first and a second detector for measuring opposing position of an object. Heights of two pairs of reference gauge blocks, a first reference gauge block W1 and a second reference gauge block W2, and the second reference gauge block W2 and a third reference gauge block W3 is first measured, and thereafter, sensitivity coefficients for calibrating the sensitivity of an upper detector 10 and a lower detector 20 are calculated by applying the measured value to a predetermined formula. The calculation is repeated three times, and each value is renewed for the upper and the lower detector 10 and 20 respectively.

7 Claims, 4 Drawing Sheets

SENSITIVITY CALIBRATING METHOD FOR DETECTOR OF COMPARATOR

BACKGROUND OF THE INVENTION

1. Field of the Invention

Present invention relates to a sensitivity calibrating method for a detector of comparator, more specifically, it relates to a method for calibrating a sensitivity of a detector of a comparator for inspecting an object such as a gauge block.

2. Description of Related Art (Comparator for gauge blocks etc.)

A comparator relating present invention in general employs "comparative measuring method" for confirming a dimension of an object, that is, such comparator measures a dimension of an object to be confirmed after acquiring reference value from a reference object as a master. In such a comparator, the objects are, for example, put on a table through holders or the like and moved to measure a plurality of objects successively. A spindle of a detector is moved in a detecting direction (an axial direction of the spindle, i.e. z-axis direction) against the moved object thereby abutting a probe provided at the tip end of the spindle, and a displacement (distance, height) of the probe from an upper surface of the table is detected.

Some of the objects to be measured by such a comparator are large in height on the table (that is, thick), and some of them are small (thin). And some of the thin objects are, for example, warped upward. In measuring such objects, measuring error is caused since the lower surface which should be in close contact with the table gets remote away from the table, thus failing in measuring with high-accuracy.

(Comparator with opposing detectors)

In order to prevent such measuring errors, a measuring method for a comparator conducting particularly accurate measurement has been developed conventionally, where another detector (second detector) with upwardly extending probe is provided inside the table as well as aforementioned upper detector (first detector), and measure the object by abutting probes on both upper and lower surface thereof.

In this method, even if the lower surface of the object is detached from the table, aforementioned errors can be prevented since the detached lower position is measured.

In such comparator with opposing two detector, width dimension of the object can also be measured by using a pair of detectors opposing in lateral direction.

(Problems in a comparator with opposing detectors)

Though highly accurately finished spindle or the like should be used for the detectors of aforementioned comparator, slight error is inevitably generated. Thus each of the upper and lower detectors has inherent errors thereof.

In order to maintain an accuracy of the comparator, sensitivity calibration is conducted for each detector as in the nature of things. However, since the sensitivity calibration is conducted based on compound values of measured value of both upper detector and lower detector, it is not clear whether the error of the comparator is caused by upper detector or lower detector.

Therefore, even if a certain error is perceived, it is difficult to determine which detector's sensitivity should be calibrated, which result in difficulty in conducting highly-accurate calibration.

A number of measurements are sometimes necessary to be repeated and confirmed of the accuracy thereof, in order to determine which detector has the error. Moreover, accurate sensitivity calibration has to be conducted thereafter.

An object of present invention is to provide a sensitivity calibration method for a detector of a comparator which enables easy and highly accurate sensitivity calibration for a first and a second detector for measuring an opposing position of an object.

SUMMARY OF THE INVENTION

The method for calibrating a sensitivity of a detector for a comparator according to present invention is for a comparator comprising a table for an object to be put on and a first and a second detector for detecting a first and second opposing surface of the object. The first and second detector outputs measured value by multiplying a respectively detected position output by a sensitivity coefficient so that the comparator measures a distance between the first surface and the second surface of the object. The calibrating method is characterized in comprising following steps, that is:

providing a first reference gauge block and a second reference gauge block on the table, the first and second reference gauge block having different distance between the first and second surface and accurately known calibration value for the distance respectively;

substantially aligning the second surface position of each reference gauge blocks;

primarily measuring the first surface of each of the reference gauge blocks with the first detector;

providing a third reference gauge block and any one of the first and second reference gauge blocks, the third reference gauge block having different distance between the first and second surface with any one of the first and second reference gauge blocks and accurately known calibration value for the distance respectively;

substantially aligning the first surface position of the third reference gauge block and any one of the first and second blocks;

secondarily measuring the first surface of the third reference gauge block and any one of the first and second reference gauge block with the second detector;

calculating a first sensitivity coefficient for calibrating the sensitivity of the first detector from a predetermined formula according to a difference in the calibration value of the first and second reference gauge blocks and a difference in the measured value of the first and second reference gauge blocks measured in the primarily measuring step, and a second sensitivity coefficient for calibrating the sensitivity of the second detector from a predetermined formula according to a difference in the calibration value of the third reference gauge block and any one of the first and second reference gauge blocks and a difference in the measured value of the third reference gauge block and any one of the first and second reference gauge blocks measured in the secondarily measuring step; and renewing the first sensitivity coefficient and the second sensitivity coefficient calculated in the calculating step as a sensitivity coefficient of the first and second detectors.

In the present invention, the first and the second detector is not confined to be a contact type detector such as using a spindle, but non-contact type detector such as optical displacement sensor may be also applicable. And the structure of the first and the second detector is not necessary to be identical.

As the first surface and the second surface to be measured, upper and lower surfaces (i.e. vertically opposing surfaces), right and left surfaces (i.e. horizontally opposing surfaces) or other opposing surfaces in the other direction may be considered. For instance, elongated gauge blocks can not be measured with the block disposed upright, so such blocks should be measured being laid down.

In the above primarily and secondary measuring steps, the reference gauge blocks may be measured only once if there is little "dispersion" in the measured value, but alternatively, may be measured twice, three times or more to improve accuracy by taking the average value of the plurality of the measurement.

The distance between the first surface and the second surface of the first, the second and the third reference gauge blocks is not confined to specific dimension.

According to present invention, since respective positions of the first surface of the first and the second reference gauge blocks are measured with the second surface of the first and the second reference gauge blocks being aligned, the difference between calibration values of the first and the second reference gauge block is observed solely as the difference between the measured values of the first detector. Accordingly, a sensitivity coefficient of the first detector can be calculated from the difference between the calibration value and the measured value.

On the other hand, since any one of the first and the second reference gauge blocks and the third block are used, and respective positions of the second surface of any one of the first and the second reference gauge blocks and the third block are measured with the first surface of any one of the first and the second reference gauge blocks and the third reference gauge block being aligned, the difference between calibration values of any one of the first and the second reference gauge blocks and the third reference gauge block is observed solely as the difference between the measured values of the second detector.

And the sensitivity calibrating process for the first and the second detector may be carried out by renewing present values with the newly calculated sensitivity coefficients.

As described above, highly accurate calibration can be securely conducted by calibrating the first and the second detector separately in the present invention.

In the present invention, a sensitivity coefficient G1 of the first detector may be calculated by the formula of;

$$G1=|(A0+Ad)-(B0+Bd)|/(|Au-Bu|/Gu0)$$

And the sensitivity coefficient G2 of the second detector may be calculated by the formula of;

$$G2=|\{B0+(Bu\times G1/Gu0)\}-\{C0+(Cu\times G1/Gu0)\}|/(|Bd-Cd|/Gd0)$$

during the control calculating step.

Each parameter may represent following specific values:
A0; calibration value of the first reference gauge block
B0; calibration value of the second reference gauge block
C0; calibration value of the third reference gauge block
Gu0; presently registered sensitivity coefficient for the first detector
Gd0; presently registered sensitivity coefficient for the second detector
Au; measured value of the first reference gauge block by the first detector
Ad; measured value of the first reference gauge block by the second detector
Bu; measured value of the second reference gauge block by the first detector
Bd; measured value of the second reference gauge block by the second detector
Cu; measured value of the third reference gauge block by the first detector
Cd; measured value of the third reference gauge block by the second detector According to present invention, by successively conducting calculation of G1 and G1, specific calculation of aforementioned control calculating step may be carried out.

The notion lying behind G1 formula basically is the difference in the first surface is found in the difference in the calibration values of each block with the second surface being aligned. In other words, the calibration value difference of each block |A0−B0| should correspond to the measured value difference of the first detector |Au−Bu|, and the ratio between them should represent correction coefficient. Therefore, the corrected sensitivity coefficient G1 may be calculated as: G1=(|A0−B0|/|Au−Bu|)Gu0.

In the above case, the term of Ad and Bd (measured values of the second detector) may be added in order to eliminate the presupposition of "with the second surface side being aligned", that is, in order to eliminate the needs for precisely aligning the second surface side. In other words, by corresponding the position of the first surface side |(A0+Ad)−(B0+Bd)| calculated based on the equation of; [the position of the second surface side (Ad, Bd)]+[the calibration value (A0, B0)]=[the position of the first surface side (Au, Bu)] and directly measured first side position |Au−Bu|, the ratio between them as correction coefficient is calculated.

The notion lying behind G2 formula basically is the difference in the second surface is found in the difference in the calibration values of each block with the first surface being aligned. In other words, the calibration value difference of each block |B0−C0| should correspond to the measured value difference of the second detector disposed on the second surface side |Bu−Cu|, and the ratio between them should consist correction coefficient. Therefore, the corrected sensitivity coefficient G2 may be calculated as: G2=(|B0−C0|/|Bu−Cu|)Gd0.

In the above case, the term of Bu and Cu (measured values of the first detector) may be added. The detailed reason of adding these terms is the same as in the description of G1.

Moreover, in order to enhance the accuracy of the values of Bu and Cu, these values are used in G1 formula as corrected values of (Bu×G1/Gu0) and (Cu×G1/Gu0).

By employing G1 and G2 formula mentioned above, the sensitivity calibration of the first and the second detector can be easily and highly accurately carried out.

In the present invention, to improve accuracy of sensitivity, a new sensitivity coefficient G1n of the first detector and a new sensitivity coefficient G2n of the second detector may be calculated using the sensitivity coefficient G2 of the second detector, according to the formula of;

$$G1n=|\{A0+(Ad\times G2/Gd0)\}-\{B0+(Bd\times G2/Gd0)\}|/(|Au-Bu|/Gu0)$$

$$G2n=|\{B0+(Bu\times G1n/Gu0)\}-\{C0+(Cu\times G1n/Gu0)\}|/(|Bd-Cd|/Gd0)$$

And, a more accurate sensitivity coefficient G1m of the first detector and a more accurate sensitivity coefficient G2m of the second detector may be by turns and repeatedly calculated for necessary times from the sensitivity coefficient G2n in the same manner as mentioned above.

According to such process, the sensitivity coefficient can be further improved by repeating calibration on the basis of the sensitivity coefficient for the first and the second detector previously calculated.

DETAILED DESCRIPTION OF THE PREFERRED EMBODIMENT(S)

A preferred embodiment according to present invention will be described below with reference to drawings.
(Summary of instrument)

Figure 1:
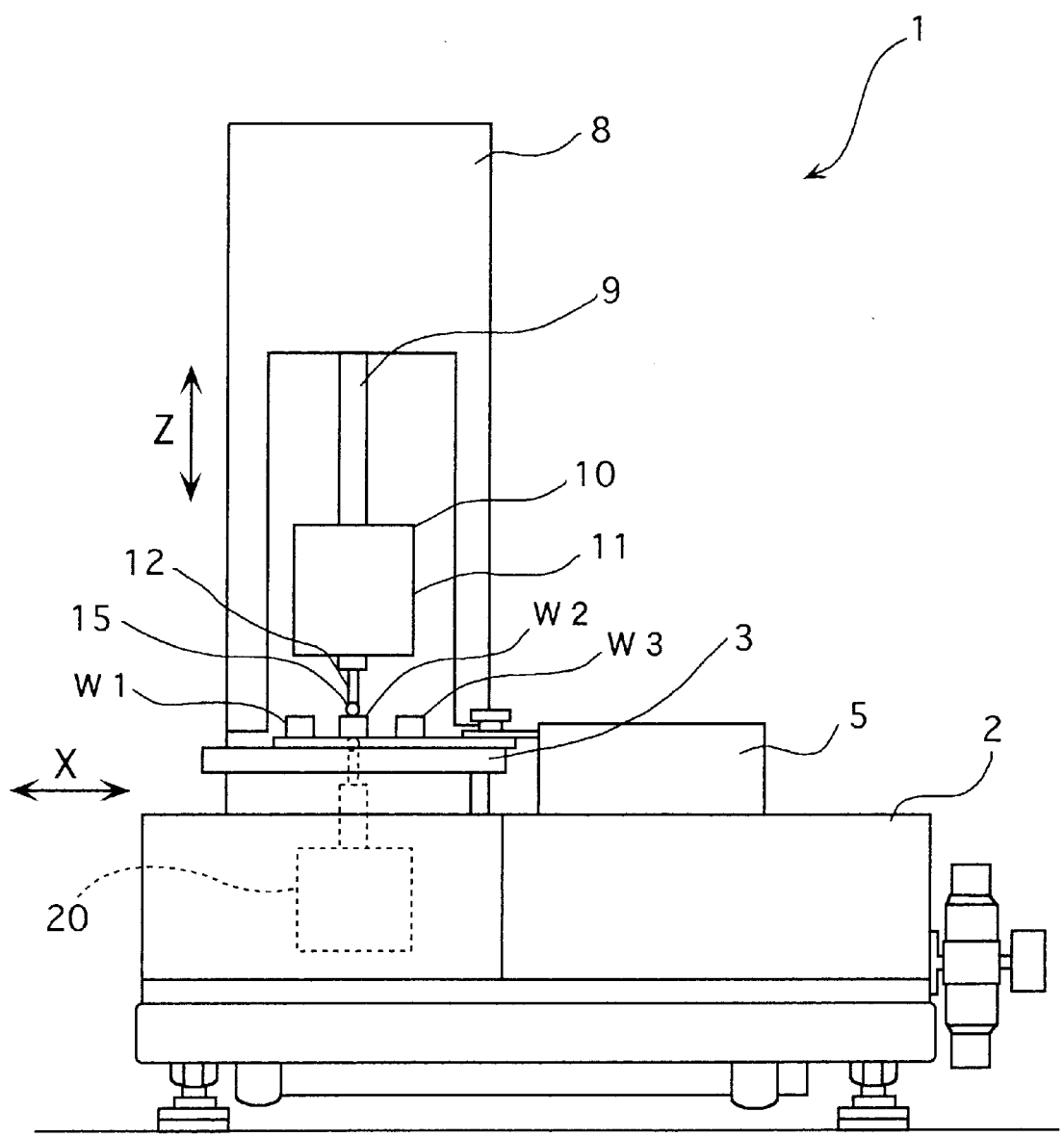
FIG. 1 is a front elevational view showing a whole comparator with a detector for applying the method for calibrating the sensitivity according to a preferred embodiment of present invention.

The sensitivity calibrating method of a detector for a comparator according to present embodiment is not to adjust analog gain, but is to calculate a coefficient for converting A/D-converted (analog-to-digital converted) digital value into micrometer and renew the digital value using the coefficient, which is applied to a comparator 1 as shown in FIG. 1.

Figure 2:
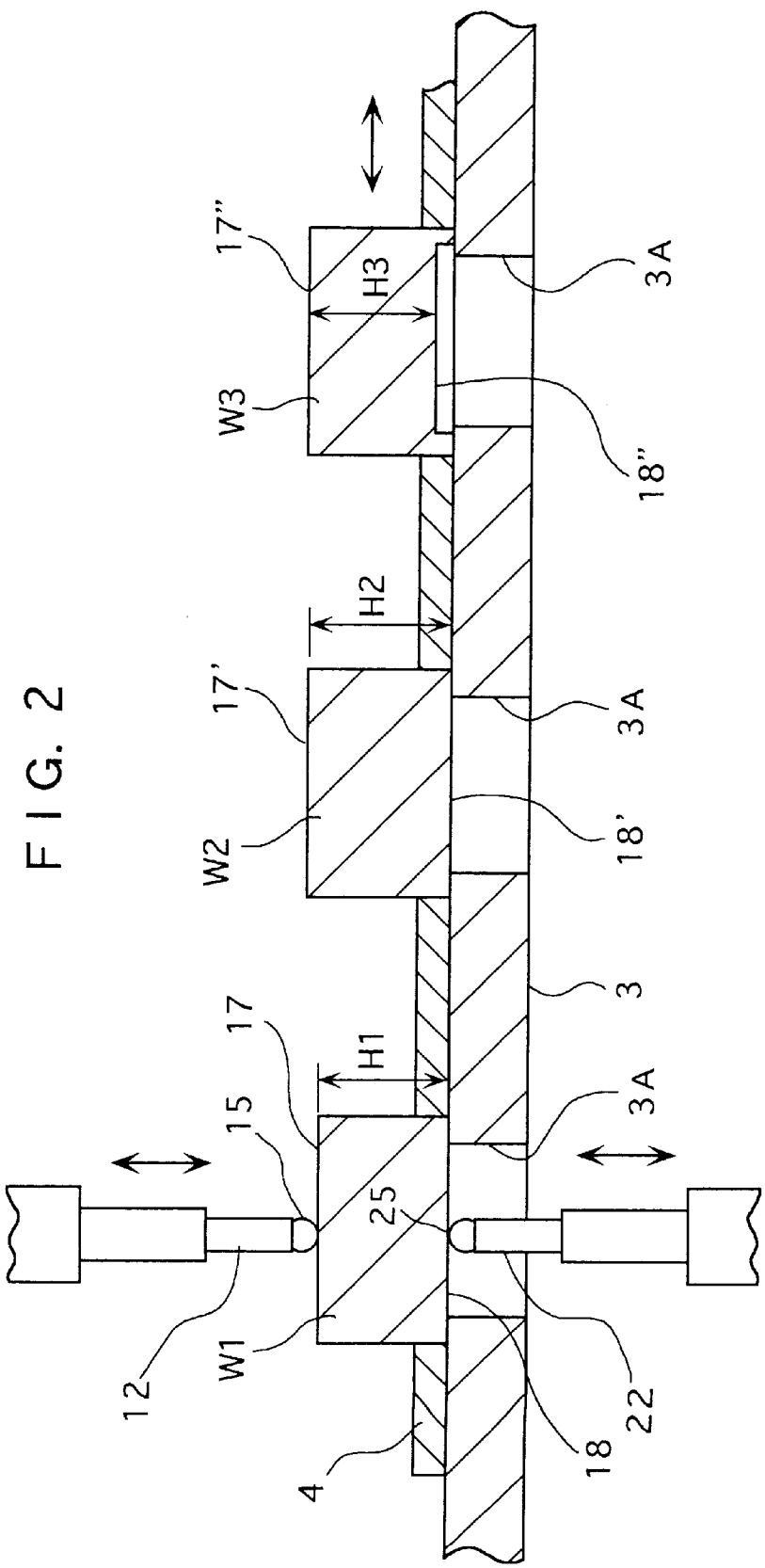
FIG. 2 is a longitudinal sectional view showing a positional relation between a reference gauge block and a spindle of a detector according to the preferred embodiment of present invention.

The comparator 1 is provided with a horizontal table 3 disposed on a base 2. As shown in FIG. 2, first, second and third reference gauge blocks W1, W2 and W3 are moved in horizontal direction (X-axis direction) being held by holder 4. The holder 4 s driven, for example, by a driving means 5 which uses cylinder.

Turning back to FIG. 1, a column 8 is provided on the base 2, and a upper detector 10 as a first detector is provided o the column 8, the upper detector 10 being slidably movable through ball screw 9 or the like in a vertical direction perpendicular to the table (i.e. Z-axis direction or detecting direction).

The upper detector comprises detector body 11, a spindle 12 attached to the detector body 11 slidably in vertical direction and a probe 15 attached to the spindle 12.

And as shown in FIGS. 1 and 2, a lower detector 20 as a second detector is provided in the table 3, the lower detector 20 having substantially the same structure as the upper detector 10. The lower detector 20 is symmetrically disposed against the upper detector 10 with the table 3 therebetween, so that respective spindles 12 and 22 are opposed with each other. A hall 3A is provided on the table 3, in a manner that the spindle 22 of the lower detector 20 can move up and down. A probe 25 is provided at the tip end (upper distal end) of the spindle 22 of the lower detector 20.

At this point, the structure of the upper detector 10 and the lower detector 20 may not be identical.

The first reference gauge block (referred to "first block" hereinafter) W1 is formed in matchbox-like substantially rectangular solid, of which height H1 is 6.000 mm, for example. The second reference gauge block (referred to "second block" hereinafter) W2 is also formed in substantially rectangular solid, of which height H2 is, for example, 6.013 mm, which is different from the height H1 of the first block W1. In other words, the position of respective upper surface 17 and 17' (a first surface) is different.

The third reference gauge block (referred to "third block" hereinafter) W3 has a concave portion on the lower surface thereof. The height H3 from the concave portion 18" to an upper surface 17" is, for example, 6.000 mm. In other words, the position of the lower surface 18" (a second surface) of the third block W3 is different. The respective height of W1 to W3 is measured by optical interferometer or the like in advance, and the heights are calibration values A0, B0 and C0 of each block W1, W2 and W3, as mentioned below.

Figure 3:
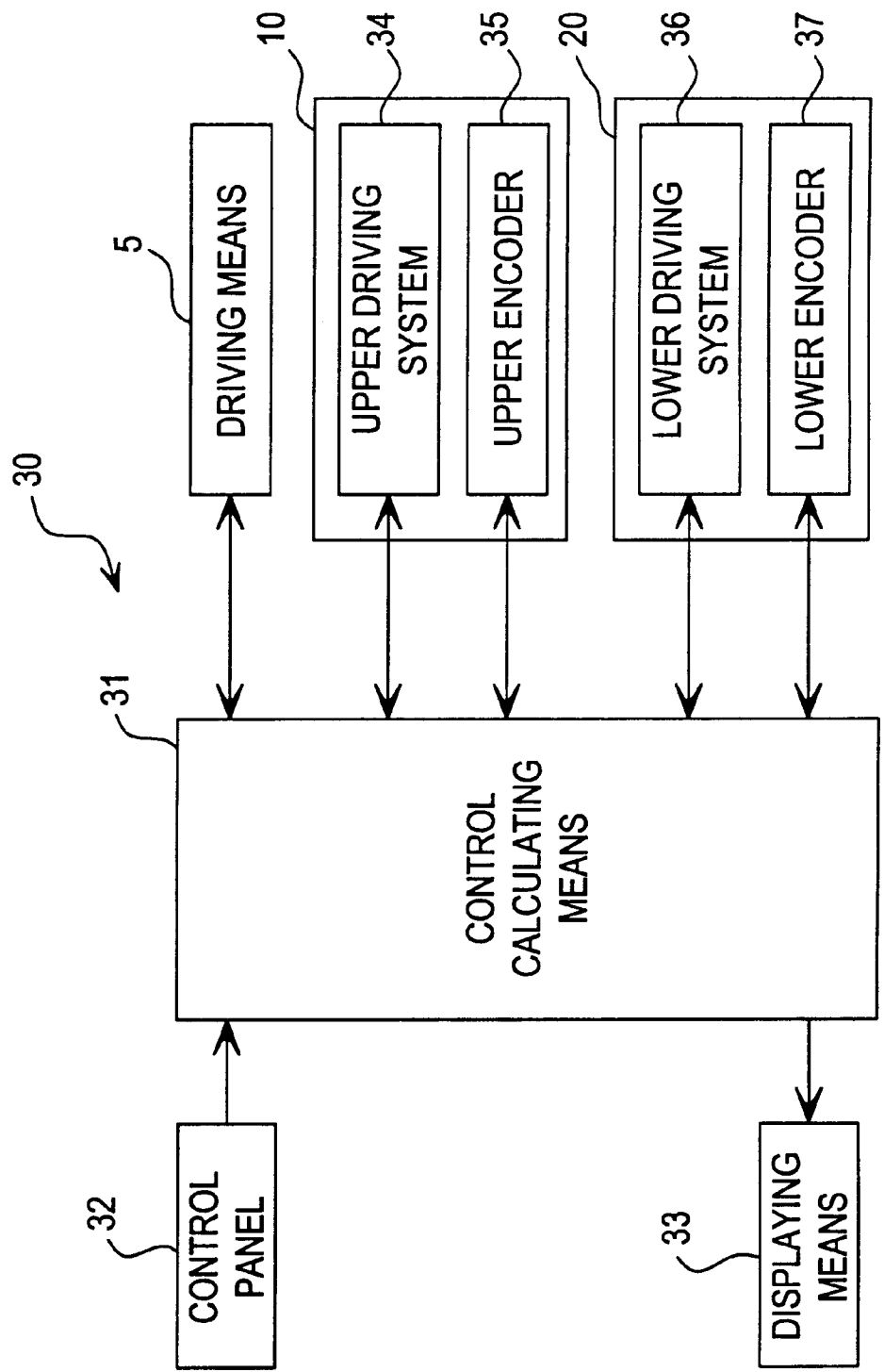
FIG. 3 is a block diagram showing a controller of the preferred embodiment of present invention.
Figure 4:
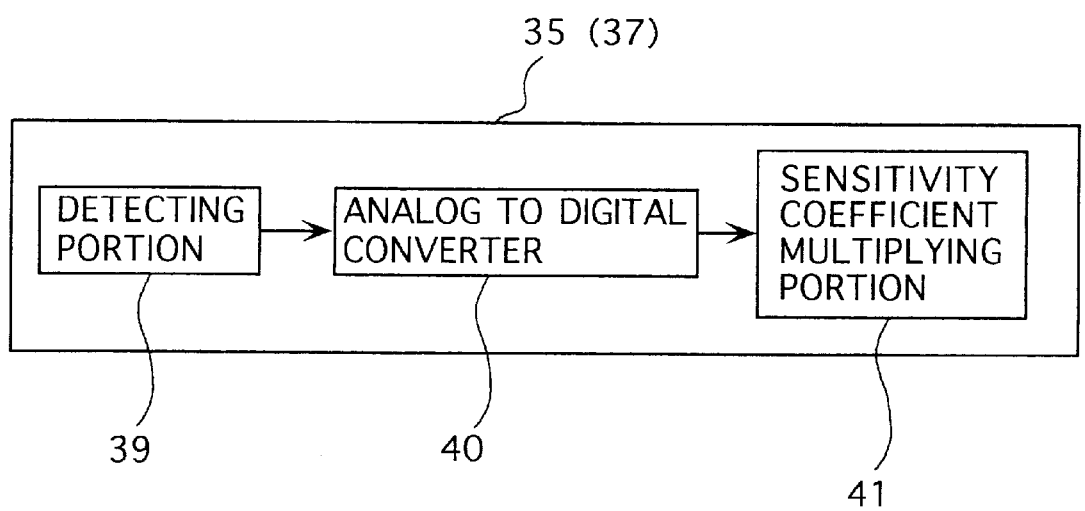
FIG. 4 is a view showing primary part of the controller of the preferred embodiment of present invention.

As shown in FIG. 3, a controller 30 of the comparator 1 comprises a control calculating means which conducts control calculating step. The control calculating means 31 comprises the driving means 5 for driving the holder 4 in the X-axis direction, the upper detector 10 for measuring the upper surface of the first and the second blocks W1 and W2, the lower detector 20 for measuring the lower surface of the second and the third blocks W2 and W3, a control panel 32 for inputting an instructing value such as calibration value of each block W1 to W3 and displaying means for displaying respective sensitivity coefficient for the upper and lower detector which is calculated and renewed based on the value measured by the upper and lower detector 10 and 20.

The upper detector 10 comprises an upper driving system 34 including the ball screw 9 for moving the spindle 12 up and down, and an upper encoder 35 for detecting the difference in the height of the first block and the second block and for displaying a displacement. The lower detector 20 comprises a lower driving system 30 for moving the spindle 22 disposed under the table 3 up and down, and a lower encoder 37 for detecting a difference in the height between the second block W2 and the third block W3 and for displaying a displacement.

Each encoder 35 and 37 comprises detecting portion 39, A/D (analog-to-digital) converter 40 for converting a detected analog value into a digital value and a sensitivity coefficient multiplying portion 41 for multiplying the converted digital value by the A/D converter 40 by a sensitivity coefficient and displaying as a displacement.
(Process)

An operation for setting a sensitivity coefficient for detector and process using the comparator 1 will be described below.

The requirement of each reference gauge blocks is mentioned as:

the calibration value of the first block W1 (height 6.000 mm)=A0, the calibration value of the second block W2 (height 6.013mm)=B0 and the calibration value of the third block W3 (height of concave portion 6.000 mm, height of convex portion 6.013 mm)=C0.

The calibration value in this embodiment means a value of the reference gauge blocks separately measured by optical interferometer or the like, in advance.

And sensitivity coefficient (estimated sensitivity coefficient) presently registered in a memory of the control calculating means 31 is mentioned below as:

the sensitivity coefficient of the upper detector=Gu0 and the sensitivity coefficient of the lower detector=Gd0.

The sign of a detected output of the detector is shown with the advancing direction of the spindle as "plus".

① The calibration value A0, B0 and C0 for the first, second and third blocks is inputted to the control panel 32 by a operation of a keyboard or the like.

② The first, second and third blocks are set onto the holder 4. It is preferable that the holder 4 is retreated away from a position right under the spindle 12 and adjacent position thereto.

③ The holder 4 is advanced so that the first block W1 comes to measurement position. The upper detector 10 and the lower detector 20 is driven by the upper driving system 34 and lower driving system respectively thereafter, and the height between the lower surface and the upper surface is measured with the probe 15 of the spindle 12 and the probe 25 of the spindle 22 being abutted to the upper surface and the lower surface of the first block W1 respectively. The measured value is memorized in the memory of the control calculating means 31 as Au; the measured value of the upper detector and Ad; the measured value of the lower detector.

The measurement is repeated three times, and the average value is used.

④ The second block W2 is measured as in the similar manner to the first block W1. The measured value is memorized in the memory of the control calculating means 31 as Bu; the measured value of the upper detector and Bd; the measured value of the lower detector.

The measurement is repeated three times, and the average value is used.

⑤ The third block is measured in the similar manner as in the above blocks. The measured value is memorized in the memory of the control calculating means 31 as Cu; the measured value of the upper detector and Cd; the measured value of the lower detector.

In the above respective steps of ③ to ⑤, the measurement is repeated three times, and the average value is used.

⑥ The sensitivity coefficient G1 for the upper detector 10 is calculated by the control calculating means 31 by applying above values to the following formula:

$$G1=|(A0+Ad)-(B0+Bd)|/(|Au-Bu|/Gu0)$$

⑦ The sensitivity coefficient G2 for the lower detector 20 is calculated by the following formula:

$$G2=|\{B0+(Bu\times G1/Gu0)\}-\{C0+(Cu\times G1/Gu0)\}|/(|Bd-Cd|/Gd0)$$

The calculated sensitivity coefficients G1 and G2 are displayed on the displaying means 33.

⑧ Above G1 and G2 is re-calculated uninterruptedly by the following formula, and G1 and G2 are repeatedly renewed.

$$G1n=|\{A0+(Ad\times G2/Gd0)\}-\{B0+(Bd\times G2/Gd0)\}|/(|Au-Bu|/Gu0)$$

(At this time, above G2 in ⑦ is used)

$$G2n=|\{B0+(Bu\times G1n/Gu0)\}-\{C0+(Cu\times G1n/Gu0)\}|/(|Bd-Cd|/Gd0)$$

(At this time, above G1n in the above formula is used)

$$G1m=|\{A0+(Ad\times G2n/Gd0)\}-\{B0+(Bd\times G2n/Gd0)\}|/(|Au-Bu|/Gu0)$$

(At this time, G2n in the above formula is used)

$$G2m=|\{B0+(Bu\times G1m/Gu0)\}-\{C0+(Cu\times G1m/Gu0)\}|/(|Bd-Cd|/Gd0)$$

(At this time, G1m in the above formula is used)

⑨ Above steps of ③ to ⑧ are repeated three times, and final sensitivity coefficient G1 and G2 is obtained.

However, when there is a large dispersion between the values calculated in each step, calibrating process should be cancelled displaying "abnormal calibration" in consideration of some abnormal situation occurred during the calibrating process.

Above embodiment is based on following basic requirement. First, as to upper side:

The true value of measured dimensional difference=(B0−A0) μm

Displacement (output) of the upper probe;
　Converted displacement value=(Bu−Au)
　A/D (analog-to-digital) value=(Bu−Au)/Gu0

Displacement (output) of the lower probe;
　Converted displacement value=(Bd−Ad)
　A/D (analog-to-digital) value=(Bd−Ad)/Gd0

Estimated displacement of the upper probe=(B0−A0)+(Bd−Ad)

Estimated sensitivity coefficient of the upper probe G1;
　G1=estimated displacement of the upper probe/displacement A/D value of the upper probe={(B0−A0)+(Bd−Ad)}/{(Bu−Au)/Gu0}

As to lower side:

The true value of measured dimensional difference=(B0−C0)μm

Displacement (output) of the lower probe;
　Converted displacement value=(Cu−Bu)
　A/D (analog-to-digital) value=(Cu−Bu)·G1/Gu0

Displacement (output) of the lower probe;
　Converted displacement value=(Cd−Bd)
　A/D (analog-to-digital) value=(Cd−Bd)/Gd0

Estimated displacement of the lower probe=(B0−C0)+(Cu−Bu)·G1/Gu0

Estimated sensitivity coefficient of the lower probe G2;
　G2=estimated displacement of the lower probe/displacement A/D value of the lower probe={(B0−C0)+(Cu−Bu)·G1/Gu0}/{(Cd−Bd)/Gd0}

(Effects of present embodiment)

Following effects can be obtained according to the present embodiment.

The position of the upper surface and the lower surface of two pairs of blocks with different upper surface height, that is, the first and the second blocks W1 and W2, and the second and the third blocks W2 and W3 are measured, separate sensitivity coefficients are calculated for the upper and the lower detector by applying the measured values and the like into a predetermined formula by control calculating means 31, and the sensitivity coefficients are separately renewed thereafter. Accordingly, inherent errors of detector 10 and 20 can be absorbed, sensitivity calibration can be easily conducted and highly accurate calibration can be achieved.

And sensitivity coefficient is automatically calculated by the control calculating means 31 based on the measured value and the like, thereby sensitivity calibration can be easily conducted.

Moreover, an average value for three measurements is used and sensitivity calibration (calculation) is conducted three times using the previously calculated values in a manner that the absolute amount of errors is reduced. Therefore, the difference between the desired values and the calibrated values is reduced after conducting each calculation, thereby ensuring highly accurate calibration.

The calibration process and error convergence according to the process will be described below using specific values.

The displacement for both of upper and lower detector is set for 13 μm.

[first calculation of upper side]

Height fluctuation of the gauge blocks on the table is estimated to be not exceeding 1 μm (not exceeding 0.3 μm, practically).

And sensitivity error of the lower detector is assumed to be 10% before sensitivity calibration.

A sensitivity correction error of the lower detector for height fluctuation amount of the gauge block is calculated as;

Sensitivity correction error rate=(height fluctuation amount)×(sensitivity error)/(displacement amount of the detector)=(1 m×10%)/13 μm≈0.8%

[first calculation of lower side]

Height fluctuation of the gauge blocks on the table is estimated to be not exceeding 1 μm. Central dimension of the third block is assumed to be diverged in 1 μm against 13 μm. A sensitivity correction error of the upper detector for height fluctuation amount of the gauge block is calculated as;

Sensitivity correction error rate=(height fluctuation amount)×(sensitivity error)/(displacement amount of the detector)=(2 μm×0.8%)/13 μm≈0.12%

[second calculation of upper side (re-calculation)]

A sensitivity correction error of the lower detector for height fluctuation amount of the gauge block is calculated as;

Sensitivity correction error rate=(height fluctuation amount)×(sensitivity error)/(displacement amount of the detector)=(1 μm×0.12%)/13 μm≈0.01%

[second calculation of lower side (re-calculation)]

A sensitivity correction error of the lower detector for height fluctuation amount of the gauge block is calculated as;

Sensitivity correction error rate=(height fluctuation amount)×(sensitivity error)/(displacement amount of the detector)=(2 μm×0.01%)/13 μm≈0.015%

As shown above, extremely low sensitivity correction error rate can e obtained at this stage, and enough error convergence is achieved.

However, another re-calculation is conducted in present embodiment, and obtained values are renewed. Accordingly, further lower sensitivity correction error rate can be obtained, thus achieving more accurate sensitivity calibration.

(Modification)

Incidentally, the scope of present invention is not restricted to aforementioned embodiment, but includes following modifications so far as the object of the invention can be attained.

In the aforementioned embodiment, the renewal of the sensitivity calibration is automatically done by controller 30, however, the process may be done manually.

In this case, the first block W1 and the second block W2 is respectively measured once. At this time, since the lower side of both of the blocks W1 and W2 is abutted to the table, similar values in both measurements are measured by the lower detector. Thereafter, sensitivity calibration for upper detector is conducted, so that the difference between the measured value of the upper detector becomes 0.013 mm, in consideration that the difference between the measured value is caused by the upper detector.

Next, the third block is measured. In comparing the values between the second block W2 and the third block W3, the values measured by the upper detector should be similar in both blocks. Accordingly, the sensitivity of the lower detector is adjusted so that the value difference between the two blocks is 0.013 mm, in consideration that the difference in the measured value is caused by the lower detector. This calibrating process is repeated twice to minimize the error.

In the present modification, the separately measured value of each detector is used to calculate sensitivity coefficient according to a predetermined formula, thereby calibrating the sensitivity of the detector.

Similar effects to the aforementioned embodiment can be achieved according to present modification.

What is claimed is:

1. A method for calibrating a sensitivity of a detector for a comparator comprising a table for an object to be put on and a first and a second detector for detecting a first and second opposing surface of the object, said first and second detector outputs measured value by multiplying a respectively detected position output by a sensitivity coefficient so that the comparator measures a distance between the first surface and the second surface of the object, the method comprising the steps of:

providing a first reference gauge block and a second reference gauge block on the table, said first and second reference gauge block having different distance between the first and second surface and accurately known calibration value for the distance respectively;

substantially aligning the second surface position of each reference gauge block;

primarily measuring the first surface of each of said reference gauge blocks with said first detector;

providing a third reference gauge block and any one of said first and second reference gauge blocks, said third reference gauge block having different distance between the first and second surface with any one of said first and second reference gauge blocks and accurately known calibration value for the distance respectively;

substantially aligning the first surface position of said third reference gauge block and any one of said first and second blocks;

secondarily measuring the first surface of said third reference gauge block and any one of said first and second reference gauge block with said second detector;

calculating a first sensitivity coefficient for calibrating the sensitivity of said first detector from a predetermined formula according to a difference in the calibration value of said first and second reference gauge blocks and a difference in the measured value of said first and second reference gauge blocks measured in the primarily measuring step, and a second sensitivity coefficient for calibrating the sensitivity of said second detector from a predetermined formula according to a difference in the calibration value of said third reference gauge block and any one of said first and second reference gauge blocks and a difference in the measured value of said third reference gauge block and any one of said first and second reference gauge locks measured in the secondarily measuring step; and renewing said first sensitivity coefficient and said second sensitivity coefficient calculated in the calculating step as a sensitivity coefficient of said first and second detectors.

2. The method for calibrating a sensitivity of a detector for a comparator according to claim 1, wherein the first sensitivity coefficient G1 for calibrating said first detector is calculated from the formula of;

$$G1=|(A0+Ad)-(B0+Bd)|/(|Au-Bu|/Gu0)$$

and wherein the second sensitivity coefficient G2 for calibrating said second detector is calculated from the formula of;

$$G2=|\{B0+(Bu\times G1/Gu0)\}-\{C0+(Cu\times G1/Gu0)\}|(|Bd-Cd|/Gd0)$$

each parameter being as follows:
A0; calibration value of said first reference gauge block
B0; calibration value of said second reference gauge block
C0; calibration value of said third reference gauge block Gu0; presently registered sensitivity coefficient for said first detector Gd0; presently registered sensitivity coefficient for said second detector Au; measured value of said first reference gauge block by said first detector Ad; measured value of said first reference gauge block by said second detector Bu; measured value of said second reference gauge block by said first detector Bd; measured value of said second reference gauge block by said second detector Cu; measured value of said third reference gauge block by said first detector Cd; measured value of said third reference gauge block by said second detector.

3. The method for calibrating a sensitivity of a detector for a comparator according to claim 2, wherein a new sensitivity coefficient G1n of said first detector and a new sensitivity coefficient G2n of said second detector is calculated using the sensitivity coefficient G2 of said second detector to improve accuracy of sensitivity by the formula of:

$$G1n=|\{A0+(Ad*G2/Gd0)\}-\{B0+(Bd*G2/Gd0)\}|/(|Au-Bu|/Gu0)$$

$$G2n=|\{B0+(Bu*G1n/Gu0)\}-\{C0+(Cu*G1n/Gu0)\}|/(|Bd-Cd|/Gd0)$$

and wherein a more accurate sensitivity coefficient G1m of said first detector and a more accurate sensitivity coefficient G2m of said second detector are determined from the sensitivity coefficient G2n in the same manner.

4. The method for calibrating a sensitivity of a detector for a comparator according to claim 1, wherein the detector is a displacement detector with a spindle to be abutted to an object to be measured.

5. The method for calibrating a sensitivity of a detector for a comparator according to claim 1, wherein the comparator further comprises a holder movable along the surface of the table for moving a plurality of objects to be successively applied to said detector.

6. The method for calibrating a sensitivity of a detector for a comparator according to claim 1, wherein the first surface and the second surface of the object is an upper surface and lower surface respectively, and wherein said first detector measures the upper surface of said reference gauge block disposed on the table and said second detector measures the lower surface of said reference gauge block disposed on the table.

7. The method for calibrating a sensitivity of a detector for a comparator according to claim 6, wherein said second detector is disposed below the table, and wherein said second detector is applied to the lower surface of the object through a hole formed on the table.

* * * * *